United States Patent
Shimano

(10) Patent No.: US 11,017,614 B2
(45) Date of Patent: May 25, 2021

(54) SHARING SYSTEM

(71) Applicant: TECHTOM Ltd., Tokyo (JP)

(72) Inventor: Shunnosuke Shimano, Tokyo (JP)

(73) Assignee: TECHTOM LTD., Tokyo (JP)

( * ) Notice: Subject to any disclaimer, the term of this patent is extended or adjusted under 35 U.S.C. 154(b) by 0 days.

(21) Appl. No.: 16/495,877

(22) PCT Filed: Jul. 31, 2017

(86) PCT No.: PCT/JP2017/027583
§ 371 (c)(1),
(2) Date: Sep. 20, 2019

(87) PCT Pub. No.: WO2018/173310
PCT Pub. Date: Sep. 27, 2018

(65) Prior Publication Data
US 2020/0013238 A1 Jan. 9, 2020

(30) Foreign Application Priority Data

Mar. 22, 2017 (JP) .............................. JP2017-056423

(51) Int. Cl.
*G07C 5/00* (2006.01)
*B60R 25/24* (2013.01)
(Continued)

(52) U.S. Cl.
CPC .............. *G07C 5/008* (2013.01); *B60R 25/24* (2013.01); *F02N 11/0825* (2013.01);
(Continued)

(58) Field of Classification Search
None
See application file for complete search history.

(56) References Cited

U.S. PATENT DOCUMENTS

| 6,040,774 A * | 3/2000 | Schepps ................. G01S 13/74 340/12.54 |
| 6,340,935 B1 * | 1/2002 | Hall ...................... G07B 15/04 340/932.2 |

(Continued)

FOREIGN PATENT DOCUMENTS

| CN | 104836860 | 8/2015 |
| CN | 106251212 | 12/2016 |

(Continued)

OTHER PUBLICATIONS

First Examination Report dated Jan. 22, 2020 in corresponding Indian Patent Application No. 201937037968.

(Continued)

*Primary Examiner* — Curtis J King
(74) *Attorney, Agent, or Firm* — Wenderoth, Lind & Ponack, L.L.P.

(57) ABSTRACT

A system includes: a transmission device provided on a vehicle, for transmitting a signal including a vehicle ID within an area set in advance; a receiving means for receiving the signal; an external control means provided on the vehicle, for receiving a command including an authentication key for a usage right, and for performing vehicle state control including at least unlocking/locking a door of the vehicle from outside a control system inherent in the vehicle; a communication connection means for establishing a communication link to send the command from a user terminal to the external control means; and a management server located on a communication network, for linking and managing the vehicle ID with a status of the usage right.

20 Claims, 11 Drawing Sheets

(51) Int. Cl.
  *F02N 11/08* (2006.01)
  *G05D 1/00* (2006.01)
  *G06Q 30/06* (2012.01)
  *G06Q 50/30* (2012.01)
  *G07B 15/02* (2011.01)
  *B60W 50/00* (2006.01)

(52) U.S. Cl.
  CPC ....... *G05D 1/0022* (2013.01); *G06Q 30/0601* (2013.01); *G06Q 30/0645* (2013.01); *G06Q 50/30* (2013.01); *G07B 15/02* (2013.01); *B60W 2050/0043* (2013.01)

(56) References Cited

U.S. PATENT DOCUMENTS

| | | | | |
|---|---|---|---|---|
| 6,751,475 | B1* | 6/2004 | Holmes | H04M 1/6091 455/406 |
| 9,200,469 | B1* | 12/2015 | Mindrum | G06F 16/9537 |
| 9,566,943 | B2 | 2/2017 | Ferrieres et al. | |
| 10,319,167 | B1* | 6/2019 | Oesterling | G07C 9/00174 |
| 2001/0037298 | A1* | 11/2001 | Ehrman | G06Q 10/02 705/40 |
| 2004/0008103 | A1* | 1/2004 | Kady | B60R 25/04 340/5.52 |
| 2006/0132291 | A1* | 6/2006 | Dourney, Jr. | G06Q 99/00 340/286.01 |
| 2006/0164259 | A1* | 7/2006 | Winkler | G08G 1/127 340/944 |
| 2007/0126603 | A1* | 6/2007 | Driscoll | G08G 1/14 340/988 |
| 2007/0281627 | A1* | 12/2007 | Kadur | G06F 9/451 455/73 |
| 2010/0114616 | A1* | 5/2010 | Touati | B60R 25/2018 705/5 |
| 2011/0040692 | A1* | 2/2011 | Ahroon | G06Q 30/0645 705/307 |
| 2011/0112969 | A1* | 5/2011 | Zaid | G06Q 10/02 705/50 |
| 2013/0297099 | A1* | 11/2013 | Rovik | B60R 16/037 701/2 |
| 2014/0114866 | A1* | 4/2014 | Abhyanker | G06Q 50/01 705/307 |
| 2014/0213176 | A1 | 7/2014 | Mendelson | |
| 2014/0242971 | A1* | 8/2014 | Aladenize | G07B 15/00 455/420 |
| 2014/0249751 | A1* | 9/2014 | Ressayre | G08B 21/0269 701/517 |
| 2015/0032580 | A1 | 1/2015 | Altermatt et al. | |
| 2015/0039466 | A1* | 2/2015 | Skinner | G06Q 30/0609 705/26.35 |
| 2015/0067458 | A1* | 3/2015 | Skinner | G06Q 10/063 715/201 |
| 2015/0186988 | A1* | 7/2015 | Skinner | G06Q 30/0645 705/314 |
| 2015/0287130 | A1* | 10/2015 | Vercollone | G06Q 30/0645 705/4 |
| 2015/0348178 | A1* | 12/2015 | Taylor | G06Q 30/0645 705/307 |
| 2016/0110928 | A1* | 4/2016 | Bin Kenaid | G01S 19/13 705/13 |
| 2016/0359671 | A1* | 12/2016 | Larcher | H04L 41/0886 |
| 2017/0259786 | A1* | 9/2017 | Burgkhardt | B60R 25/104 |
| 2018/0137437 | A1* | 5/2018 | Chan | G06K 19/06037 |
| 2018/0322273 | A1* | 11/2018 | Biondo | B60R 16/023 |
| 2019/0001925 | A1* | 1/2019 | Arakawa | G07C 9/00309 |
| 2019/0039568 | A1* | 2/2019 | Froitzheim | B60R 25/209 |
| 2019/0050820 | A1* | 2/2019 | Atsumi | G07B 15/00 |
| 2019/0130664 | A1* | 5/2019 | Appel | G06N 20/00 |
| 2019/0193678 | A1* | 6/2019 | Leiber | B60R 25/2018 |
| 2019/0193681 | A1* | 6/2019 | Ito | G06F 21/32 |
| 2019/0197471 | A1* | 6/2019 | Endo | G06F 9/541 |
| 2019/0202399 | A1* | 7/2019 | Troia | G06Q 30/0645 |
| 2019/0228383 | A1* | 7/2019 | Abler | G07C 5/006 |
| 2019/0279437 | A1* | 9/2019 | Borras | G06Q 50/30 |
| 2019/0287065 | A1* | 9/2019 | Shintani | G06Q 10/08355 |
| 2019/0295005 | A1* | 9/2019 | Griffin | G06Q 30/0605 |
| 2019/0370578 | A1* | 12/2019 | Meng | G06K 9/00906 |

FOREIGN PATENT DOCUMENTS

| | | | |
|---|---|---|---|
| CN | 106604233 A | * | 2/2017 |
| JP | 2001-357486 | | 12/2001 |
| JP | 2016-085491 | | 5/2016 |
| JP | 5978414 | | 8/2016 |
| JP | 2016-206813 | | 12/2016 |
| WO | 2013/177331 | | 11/2013 |
| WO | 2016/000014 | | 1/2016 |

OTHER PUBLICATIONS

International Search Report dated Aug. 29, 2017 in International (PCT) Application No. PCT/JP2017/027583.
Office Action dated Apr. 14, 2020 in corresponding CN Application No. 201780088677.7, with partial machine translation.
Office Action dated Oct. 8, 2020 in corresponding Indian Patent Application No. 201937037968.

* cited by examiner

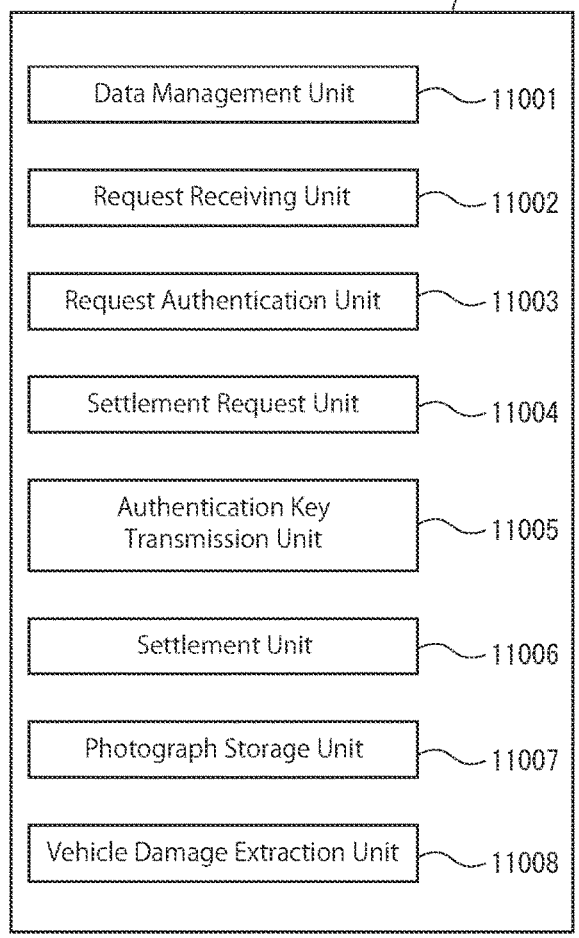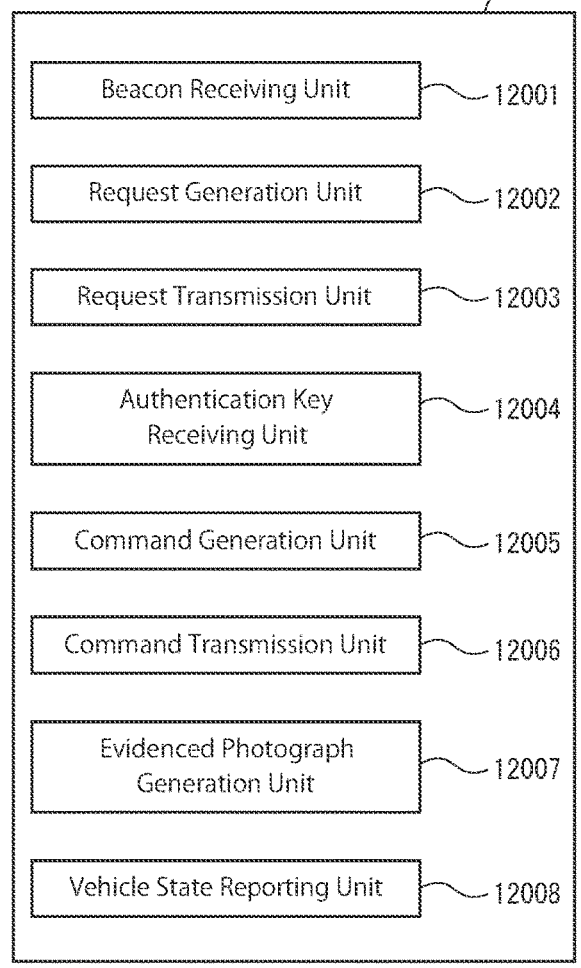

SHARING SYSTEM

TECHNICAL FIELD

The present invention relates to a system concerning use of sharing, and more particularly, to a sharing system for realizing handover of a usage right to use a shared vehicle and settlement for the handover via a mobile terminal of a user.

BACKGROUND ART

In the use of a shared vehicle, many systems have been adopted in which settlement is made by a credit card or other settlement means registered in member registration done by a user in advance.

A system has been used for using a browser function of a smartphone or other mobile terminals to reserve the use of a shared vehicle. However, handover of the right to use the shared vehicle can not be done at an appropriate timing when he is close to the vehicle available actually.

In the conventional system using a mobile terminal, in exchange for the settlement for the handover of the usage right, the usage right to release a lock of the door or engine of the sharing vehicle can be given to the user at a timing when the reservation time comes.

However, even in a state where he is not close to the vehicle, it is possible to release the door lock or the like by remote control when the reservation time comes. The system can not permit handover of the right to use the shared vehicle and the settlement for the handover only in a situation suitable for the handover.

In the above-described system for handover and settlement in the sharing service, malicious tampering or fraud may occur by remote control from a smartphone, a personal computer, or the like.

Patent Literature 1 describes a prior art for preventing tampering and fraud via remote control in settlement from a mobile terminal. This provides a checkout system. A mobile terminal is used to realize checkout environment which enables safe and easy checkout without being bound to a checkout machine. The checkout system performs checkout in bicycle parking and/or car parking facility providing service.

However, the system described in Patent Literature 1 is difficult to be applied to a system for a shared car or other systems with no checkout machine.

PRIOR ART DOCUMENTS

Patent Literature

Patent Literature 1: JP 2016-085491 A

SUMMARY OF INVENTION

Technical Problem

The present invention aims to provide a system to enable permitting handover of a usage right, which is enabled by a user using a mobile terminal to make a remote control for release of a door lock or the like, and settlement for the handover, when the user is close to a shared vehicle, a situation is appropriate for the handover of the usage right, and a reservation time comes or other condition is fulfilled.

Solution to Problem

A first aspect of the present invention provides a shared car system. In this, a user operates a user terminal possessed by him to execute settlement for handover of a usage right to use a vehicle for a certain period. The system includes the following components:

a) a transmission device provided on the vehicle, for transmitting a signal including a vehicle ID within an area set in advance;

b) a receiving means provided on the user terminal, for receiving the signal;

c) an external control means provided on the vehicle, for receiving a command including an authentication key for the usage right, and for performing vehicle state control including at least unlocking/locking a door of the vehicle from outside a control system inherent in the vehicle;

d) a communication connection means for establishing a communication link to send the command from the user terminal to the external control means; and e) a management server located on a communication network, for linking and storing the vehicle ID with a status of the usage right.

The management server compares a request including a vehicle ID sent from the user terminal for the handover with the stored vehicle ID to make authentication. Based on a result of the authentication and a state of the status, it issues an authentication key for the usage right to the user terminal. And, it executes settlement for the handover by the user terminal.

A second aspect of the present invention provides a shared car system. In this, a user operates a user terminal possessed by him to execute settlement for handover of a usage right to use a vehicle for a certain period. The system includes the following components:

a) a first transmission device installed on the vehicle, for transmitting a first signal including a vehicle ID;

b) a second transmission device installed on a storage location of the vehicle, for transmitting a second signal including a storage location ID;

c) a receiving means provided on the user terminal, for receiving the first signal and the second signal;

d) an external control means provided on the vehicle, for receiving a command including an authentication key for the usage right and for performing vehicle state control including unlocking/locking a door of the vehicle from outside a control system inherent in the vehicle;

e) a communication connection means for establishing a communication link between the user terminal and the external control means; and f) a management server located on a communication network, for linking and storing the storage location ID, the vehicle ID and a status of the usage right.

The management server compares a request including a storage location ID and a vehicle ID sent from the user terminal with the stored storage location ID and vehicle ID to make authentication. Based on a result of the authentication and a state of the status, it issues an authentication key for the usage right to the user terminal. And, it executes settlement for the handover by the user terminal.

In any aspect of the invention, the communication link may be a communication link by connecting a short-range wireless means provided on the user terminal and a short-range wireless means provided on the vehicle.

Further, the communication link may be a communication link established by communication between the user terminal and the management server, and communication between the management server and the external control means.

In any aspect of the invention, the vehicle state control may include restricting/releasing engine start of the vehicle.

In any aspect of the invention, the settlement may include a settlement of a minimum charge at a time of renting out the vehicle.

In the second aspect of the invention, the user terminal may include a camera, and a vehicle state reporting means for sending to the management server a certification photograph obtained by attaching a storage location ID or a vehicle ID to an image of the vehicle acquired by the camera.

The management server may receive the certification photograph to associate and store it with a record of handover of the usage right or the settlement.

The image may include an image of a vehicle site selected by the user.

The image may be an image acquired at a time of renting out the vehicle, or at a time of returning back the vehicle.

Furthermore, the image may include images acquired at a time of renting out the vehicle and at a time of returning back the vehicle. The image at a time of renting out and the image at a time of returning back may be compared to extract the vehicle damage occurring during the sharing.

In the first aspect of the invention, the signal may be a beacon or Bluetooth®.

In the second aspect of the invention, the first signal may be a beacon, Bluetooth® or RFID.

In the second aspect of the invention, it may further include a third transmission device for transmitting a third signal. The authentication may include authentication of the third signal received by the user terminal.

BRIEF DESCRIPTION OF THE DRAWINGS

FIG. 11 is a block diagram illustrating functional configuration of a management server 10013;

FIG. 12 is a block diagram illustrating functional configuration of a user terminal 10012;

DETAILED DESCRIPTION OF THE EMBODIMENTS

Specific examples of the present invention will be described below with reference to the drawings.

In the examples, functions of the present invention are realized by functional components. Each of them, in turn, is realized by firmware or other control program incorporated in advance, or an application stored in a storage device. They are executed by a mobile terminal, a computer, a circuit or other processors to cooperate with various devices.

Example 1

Figure 1:
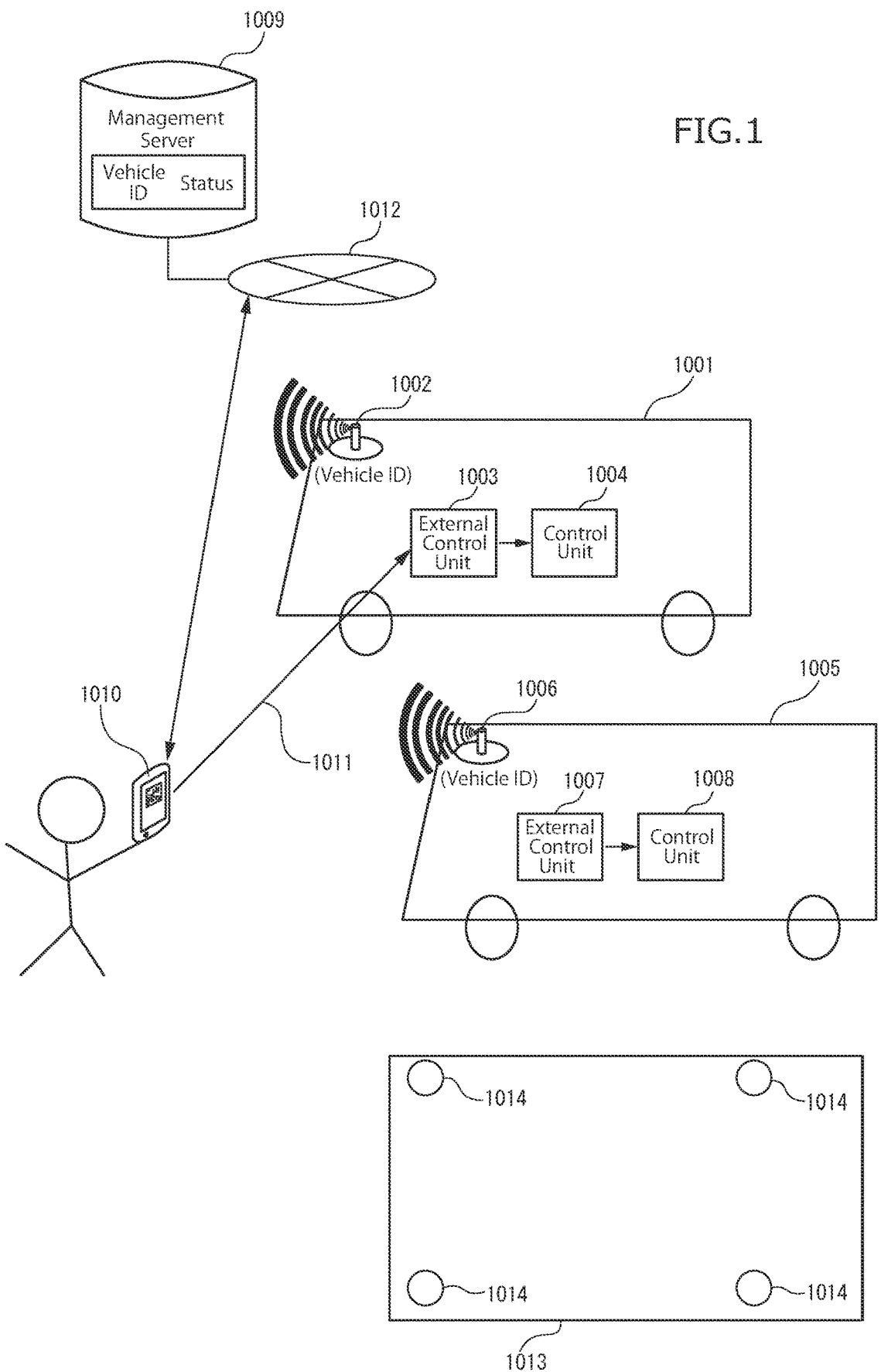
FIG. 1 is an overall diagram illustrating configuration of a system according to a first example of the present invention.

FIG. 1 is an overall diagram illustrating configuration of a system according to a first example of the present invention. The configuration includes a first shared car 1001, a second shared car 1005, a management server 1009 for managing a sharing service, a user terminal 1010 owned by a user who intends to use a shared car, a wide area network 1012 of an upper layer, and a photographing area 1013 including lighting devices 1014 for taking an evidenced photograph, which will be described later.

The first shared car includes a beacon transmission device 1002 that transmits a beacon including a vehicle ID, and an external control unit 1003 that controls a control unit 1004 inherent in the vehicle from outside of its system. An arrow 1011 indicates Bluetooth® communication. This is a communication link between the user terminal 1010 and the external control unit 1003.

Similarly, the second shared car 1005 includes a beacon transmission device 1006, and an external control unit 1007 that controls a control unit 1008 inherent in the vehicle from outside of its system.

Here, two shared cars are described. However, the configuration according to the present invention is not limited to this. It may be changed as appropriate according to a location where the sharing service is provided or the number of vehicles that can be prepared.

Also, the communication link is not limited to the Bluetooth® communication shown here. A communication link or the like via a management server or the like on a wide area network may be adopted as appropriate, as will be shown later.

The management server 1009 associates and stores a vehicle ID of a vehicle used for the sharing service with a status representing availability of the vehicle.

The status is a vehicle state representing availability for each time period. Here, one of four vehicle states is stored: in use by a user, reserved, during maintenance, and idling. It is updated and recorded every time the status changes.

Figure 2:
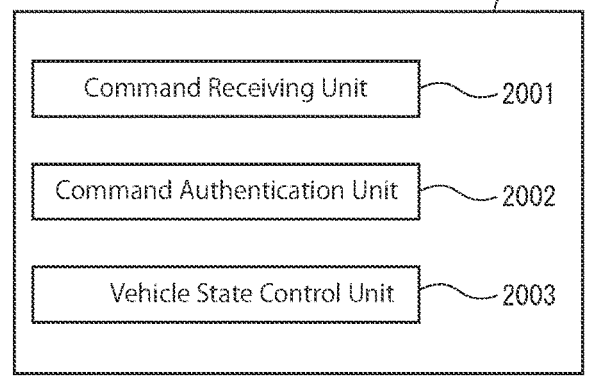
FIG. 2 is a block diagram illustrating functional configuration of an external control unit 1003.

FIG. 2 is a block diagram illustrating functional configuration of the external control unit 1003. The functional configuration includes a command receiving unit 2001 that receives a command via a communication link formed between it and the user terminal, a command authentication unit 2002 that compares an authentication key included in the command with an authentication key set in advance to make authentication, and a vehicle state control unit 2003 that connects with the control unit 1004 to send out a signal for controlling a vehicle state, which includes unlocking/locking of a door.

Thereby, when settlement for handover of the usage right is arranged, a user who receives an issue of an authentication key can transmit a command from a user terminal of the user to unlock/lock the door from outside of the vehicle original system to use the vehicle. This enables handover of the right to use the vehicle to be shared.

Figure 3:
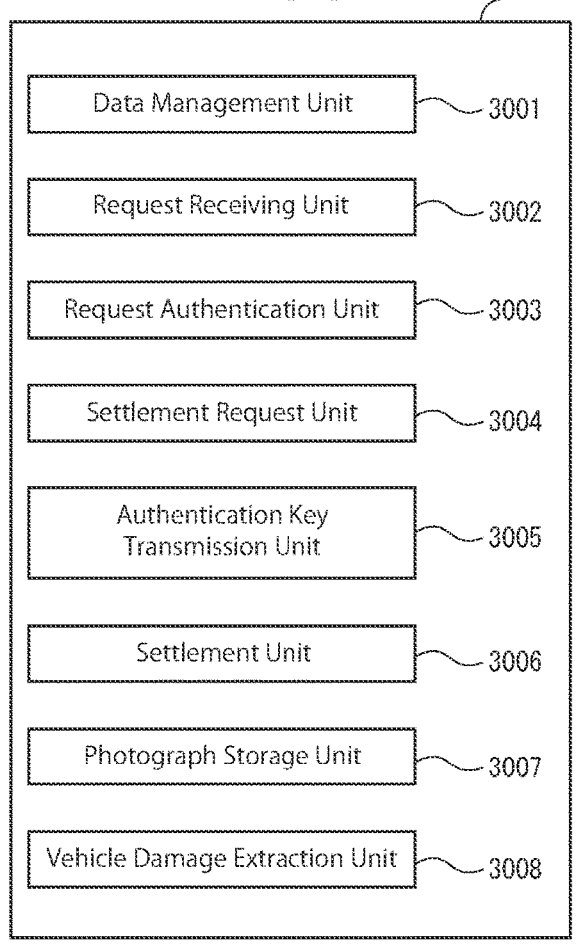
FIG. 3 is a block diagram illustrating functional configuration of a management server 1009.

FIG. 3 is a block diagram illustrating functional configuration of the management server 1009.

A data management unit 3001 associates and manages the vehicle ID of the shared car with the status representing availability of the vehicle.

A request receiving unit 3002 receives a request from a user terminal via the wide area network 1012.

A request authentication unit 3003 authenticates the vehicle ID included in the request and compares a requested time period and a status to determine availability.

A settlement request unit 3004 requests for settlement to a settlement institution designated by the requesting user, and receives a reply representing whether the settlement is allowable.

An authentication key transmission unit 3005 sends the authentication key via the wide area network 1012 to the requesting user terminal having obtained positive determination for availability and positive reply for allowability for settlement, to issue the authentication key. This is deemed as handover of the usage right.

A settlement unit 3006 calculates a charge concerning settlement for the user for whom the authentication key is issued. This is made by referring to a status at the time of returning back to obtain a usage time. And it executes the settlement for sharing.

A photograph storage unit 3007 receives an evidenced photograph, which will be described later, from the user terminal via the wide area network, to associate and store it with the handover of the usage right and the record of the settlement.

A vehicle damage extraction unit 3008 compares the above-described evidenced photographs which are associated and stored. The evidenced photographs are one at a time of commencing use and one at a time of returning back. Thereby, it extracts vehicle damage. When extracting the vehicle damage, it automatically informs a predetermined administrator via e-mail or the like.

Figure 4:
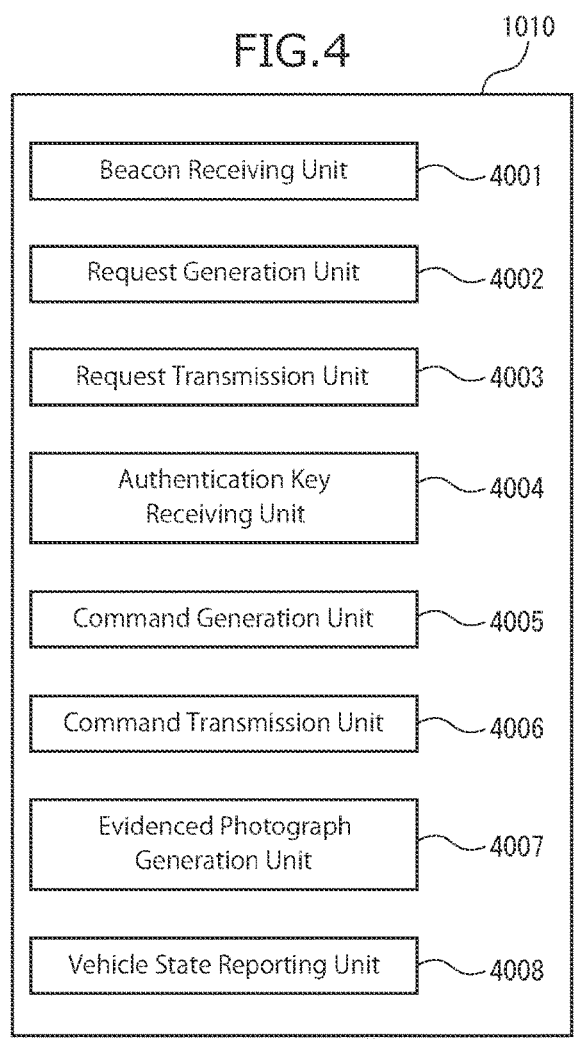
FIG. 4 is a block diagram illustrating functional configuration of a user terminal 1010.

FIG. 4 is a block diagram illustrating functional configuration of the user terminal 1010.

A beacon receiving unit 4001 adopts a receiving system coping with a beacon transmitted by the beacon transmission device provided on the shared car, and is set so as to receive the beacon when the electric field strength exceeds a value set in advance. By being set in this way, it receives the beacon and acquires the vehicle ID included in the beacon, only when the user approaches the shared car.

A request generation unit 4002 generates a request including the vehicle ID and a usage time period of the shared car input from an interface, not shown.

A request transmission unit 4003 sends the request for using the shared car to the management server via the wide area network.

An authentication key receiving unit 4004 receives the authentication key sent from the management server via the wide area network.

A command generation unit 4005 accepts a signal input by a user from an interface, not shown, to request for commencing use or to request for returning back, to generate a command including a door unlock instruction and the authentication key of the shared car at a time of commencing to use the shared car, and to generate a command including a door lock instruction and the authentication key of the shared car at a time of returning back the shared car.

A command transmission unit 4006 sends the command including the authentication key via the communication link 1011 to the external control unit provided on the shared car.

An evidenced photograph generation unit 4007 assists the user to generate an evidenced photograph by a system to be described later.

A vehicle state reporting unit 4008 accepts a sending request input by the user from an interface, not shown, to send the evidenced photograph, created by the user with assistance of the evidenced photograph generation unit, to the management server via the wide area network.

Here, the communication of the 3G/LTE system is adopted as the communication via the wide area network. However, the wide area network of the present invention is not limited to this. It may be changed as appropriate.

Figure 5:
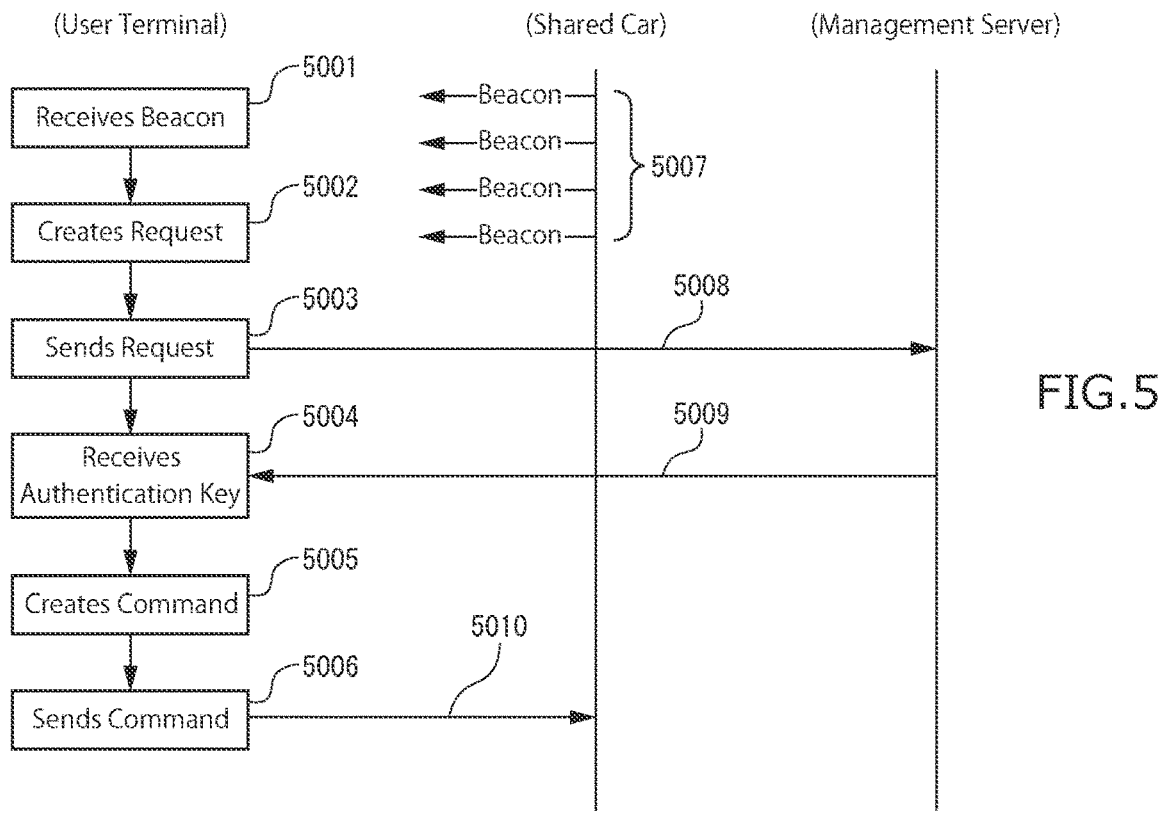
FIG. 5 is a flow chart focusing on the user terminal to illustrate operations concerning a request.

FIG. 5 is a flow chart focusing on the user terminal to illustrate operations concerning a request.

In the beacon receiving step 5001, when the user approaches a shared car, the electric field strength of the beacon exceeds the value set in advance. Then, the beacon receiving unit 4001 receives the beacon including a vehicle ID of the shared car, and acquires the vehicle ID. Beacons 5007 are launched by the beacon transmission device provided on the shared car.

In a request creation step 5002, a request is created. This includes a vehicle usage time and the vehicle ID.

In a request sending step 5003, the generated request is sent to the management server. A wide area communication 5008 is from the user terminal to the management server.

In an authentication key receiving step 5004, an authentication key is received. It is a reply to the authenticated request. A wide area communication 5009 is from the management server to the user terminal.

In a command creation step 5005, a command is generated. At a time of commencing to use the shared car, this includes a door unlock instruction and the authentication key of the shared car. At a time of returning back the shared car, the generated command includes a door lock instruction and the authentication key of the shared car.

In a command sending step 5006, the command including the authentication key is sent via a communication link with an external control unit provided on the shared car. A sending 5010 is via a communication link from the user terminal to the external control unit.

Figure 6:
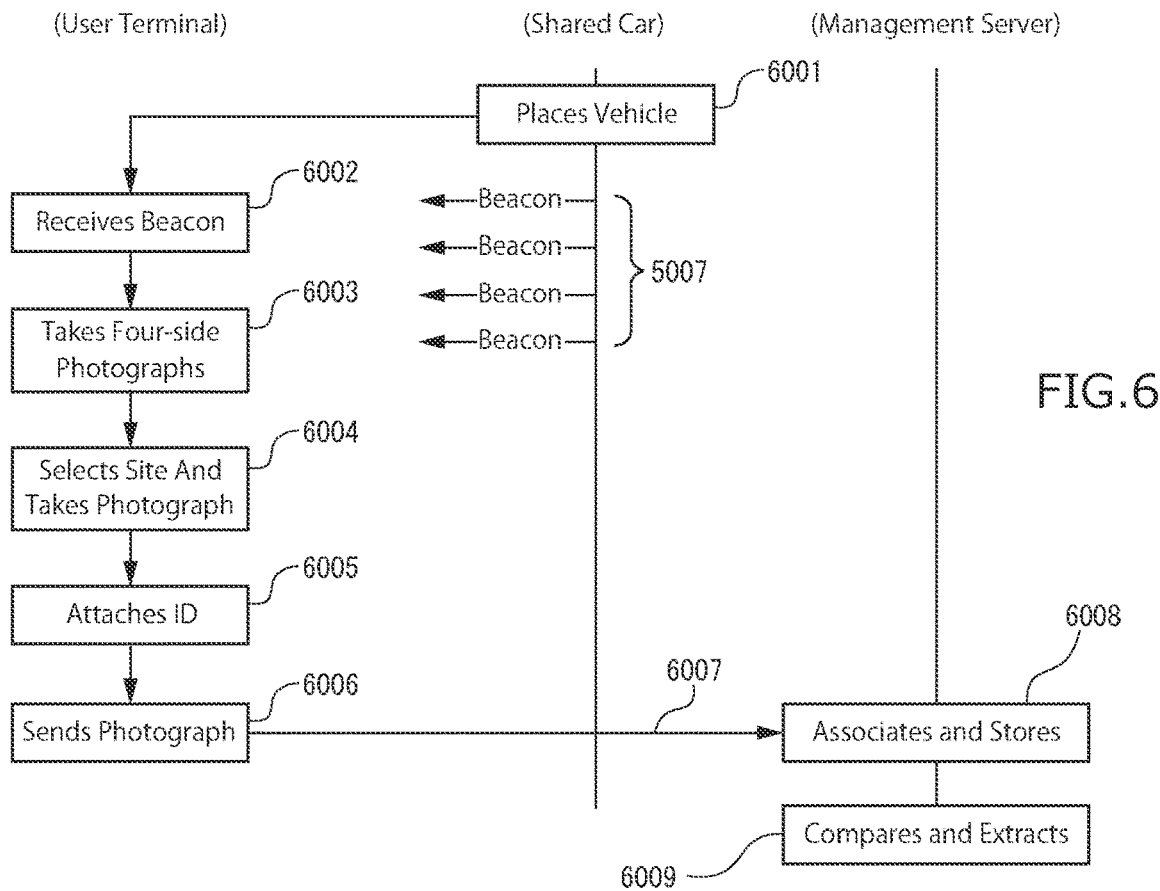
FIG. 6 is a flow chart focusing on the user terminal to illustrate operations for generating and sending an evidenced photograph, and related operations of the management server.

FIG. 6 is a flowchart focusing on the user terminal to illustrate operations of generating and sending an evidenced photograph, and related operations in the management server. This is the same for both at a time of commencing to use and at a time of returning back the shared car.

In a vehicle placing step 6001, the user places the shared car in a photographing area 11013.

In a beacon receiving step 6002, the user terminal receives a beacon, and acquires a vehicle ID. Beacons 5007 are launched by the beacon transmission device provided on the shared car.

In a four-side photographing step 6003, a user interface, not shown, in the user terminal shows guidance for acquiring four-side photographs, including a front side, left and right sides and a rear side. The user follows it to operate a camera provided on the user terminal to take the four-side photographs.

In a selected site photographing step 6004, the user follows a user interface, not shown, to operate a camera provided on the user terminal to select a site and take a photograph that the user considers necessary to do so.

In an ID attaching step 6005, the user terminal attaches the vehicle ID included in the beacon to the photograph acquired in accordance with the above-described steps, to generate an evidenced photograph.

In a photograph forwarding step 6006, the user terminal sends the evidenced photograph to the management server via the wido area network. A sending 6007 is via the wide area network.

In an association storing step 6008, the management server associates and stores the evidenced photograph with a record of the handover of the usage right and settlement.

In a comparison and extraction step 6009, the management server compares the evidenced photograph at a time of commencing to use with the evidenced photograph at a time of returning back, to extract damage of the vehicle. When extracting vehicle damage, the management server notifies an administrator's address.

Figure 7:
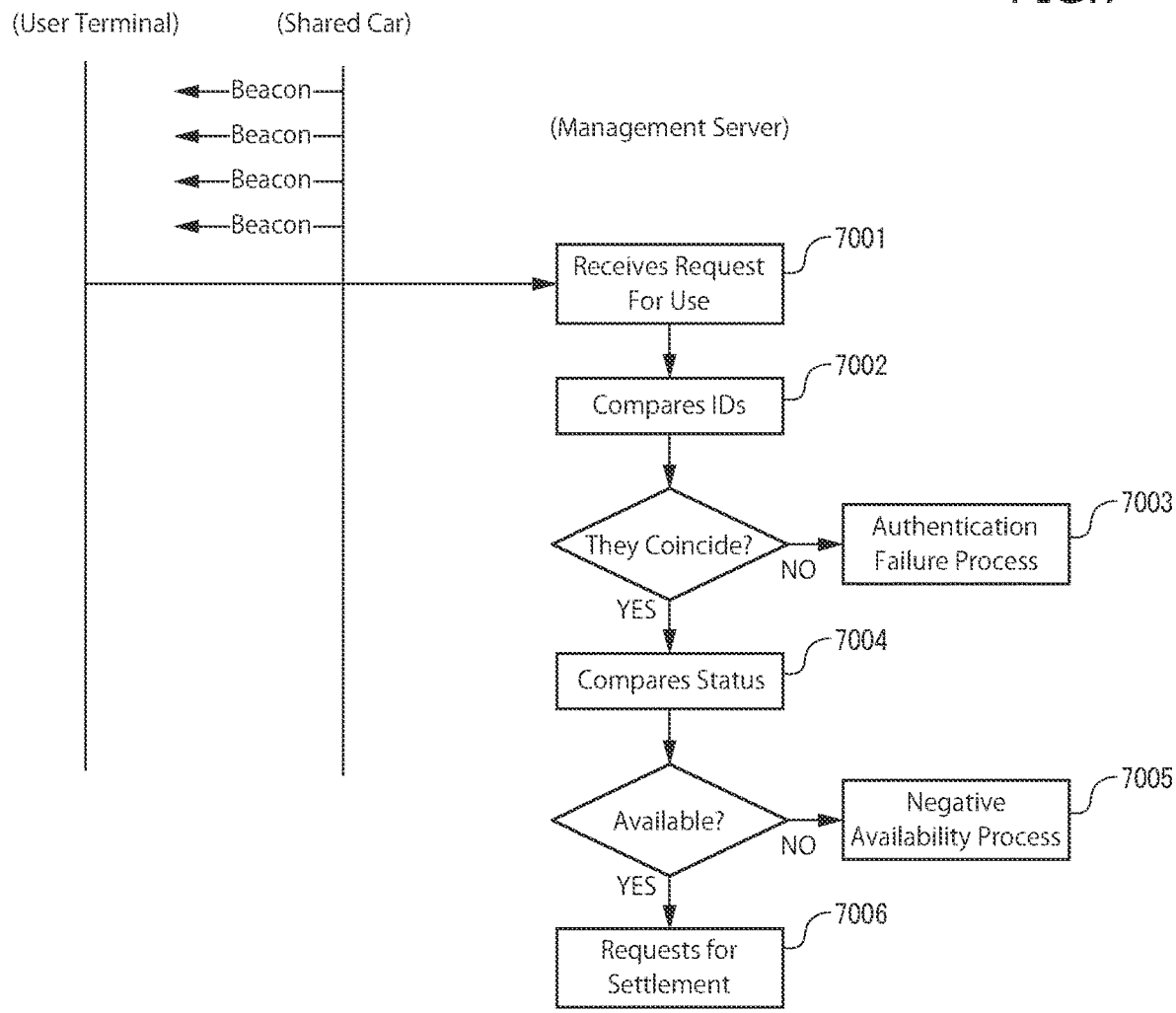
FIG. 7 is a flow chart focusing on the management server to illustrate operations from a request for use of a shared car to a request for settlement.

FIG. 7 is a flowchart focusing on the management server to illustrate operations from a request for use of a shared car to a request for settlement.

In a use request receiving step 7001, the management server receives a request that requests for commencing use from the user terminal via the wide area network.

In an ID comparison step 7002, the management server compares the vehicle ID included in the request with a vehicle ID stored in the management server.

When no vehicle ID coincides, the operation of the management server shifts to an authentication failure process 7003. It notifies the user terminal of the authentication failure, or otherwise performs predetermined operations.

When a vehicle ID coincides, the operation of the management server shifts to a status comparison step 7004. It compares the vehicle usage time included in the request with a time period with an idling status stored in association with the vehicle ID, to determine availability.

When the vehicle usage time and the idling time period do not match, the availability is negative. The operation of the management server shifts to a negative availability process 7005. It notifies the user terminal that the vehicle is not idling, or otherwise performs predetermined operations.

When the vehicle usage time and the idling time period match, the availability is positive, and thereby the authentication is completed. The operation of the management server shifts to a settlement request step 7006. It requests for settlement to a settlement server of the settlement institution designated in advance by the user.

Figure 8:
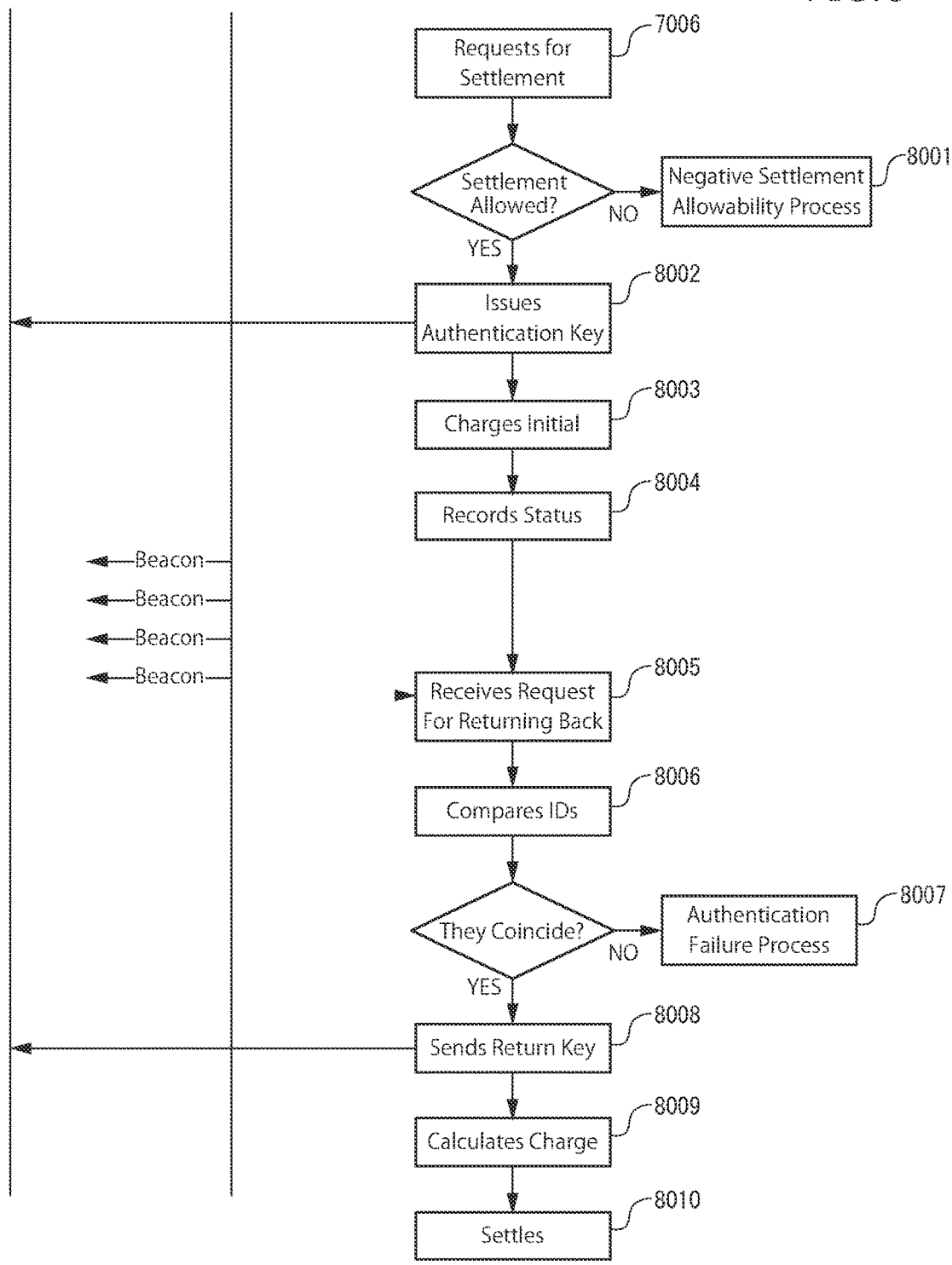
FIG. 8 is a flow chart focusing on the management server to illustrate operations from a request for settlement for the use of the shared car to execution of the settlement.

FIG. 8 is a flowchart focusing on the management server to illustrate operations from a request for settlement for the use of the shared car to execution of the settlement.

When a negative settlement allowability notification is received from the settlement server in response to the request in the settlement request step 7006, the settlement is impossible. The operation of the management server shifts to an negative settlement allowability process 8001. It makes notification that the settlement institution designated by the user cannot be used, or otherwise performs predetermined operations.

When a positive settlement allowability notification is received from the settlement server, the settlement is possible. The operation of the management server shifts to an authentication key issuing step 8002. It sends an authentication key to the user terminal via the wide area network. This is necessary for activating the external control unit of the shared car having the vehicle ID included in the request.

In an initial charging step 8003, the management server performs a settlement process to the settlement server for initial charging in exchange for the handover of the usage right by sending the authentication key.

In a status recording step 8004, the management server records the usage time period included in the request as "in use".

In a return request receiving step 8005, the management server receives a return request sent from the user terminal via the wide area network.

In an ID comparison step 8006, the management server compares the vehicle ID included in the request with the vehicle ID stored in the management server, to make authentication. When the ID included in the request does not coincide with the vehicle ID stored in the management server, the operation of the management server shifts to a authentication failure process 8007. It notifies the user terminal of the authentication failure, or otherwise performs predetermined operations.

When they coincide, the authentication succeeds. The operation of the management server shifts to a return key sending step 8008. It sends an authentication key for locking and returning back the shared car to the user terminal via the wide area network.

In a charge calculation step 8009, the management server performs a calculation for multiplying the usage time by a predetermined unit price per hour, to calculate a charge.

In a settlement step 8010, the management server notifies the settlement institution of the calculated charge, to perform a settlement process.

Figure 9:
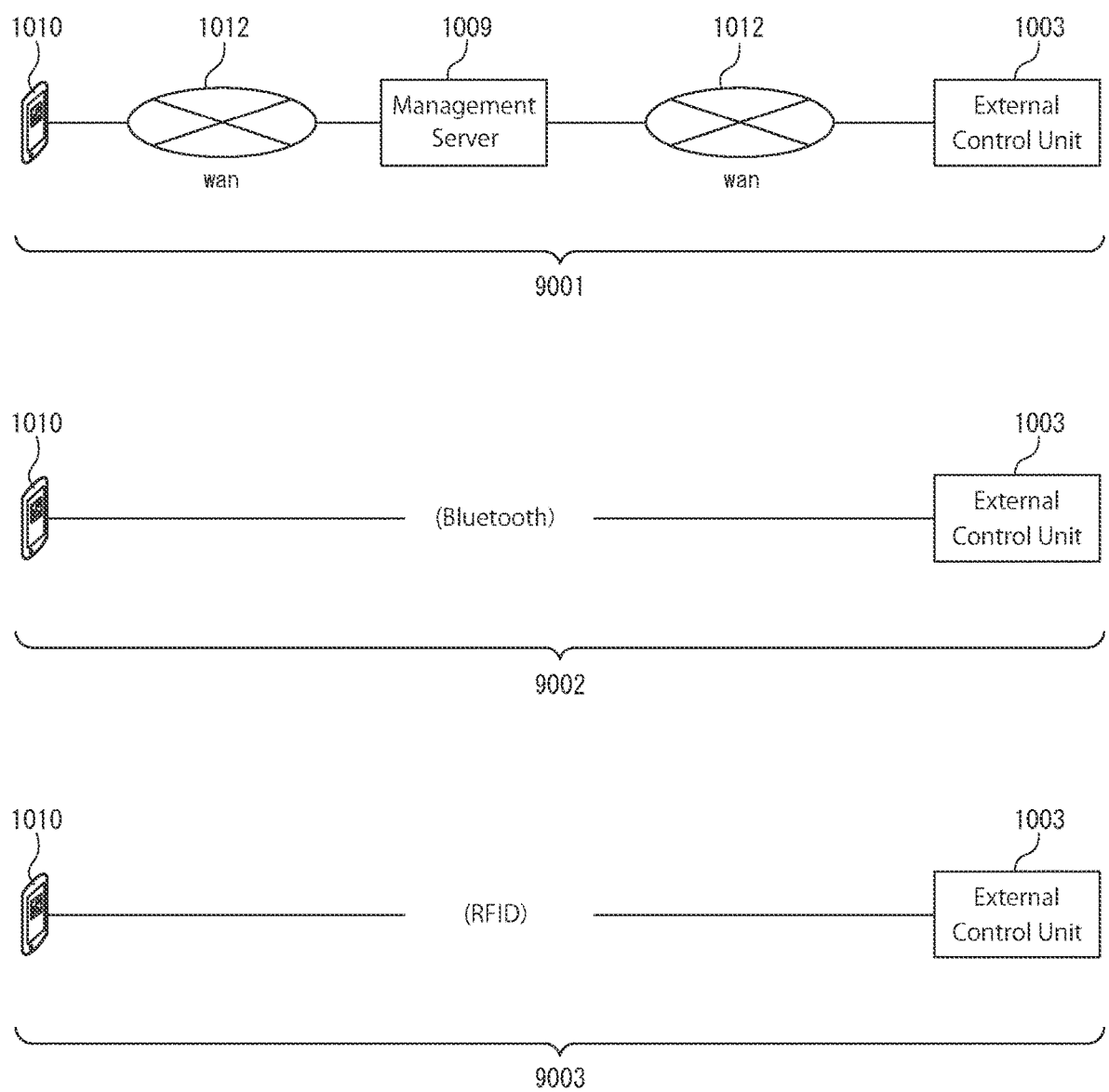
FIG. 9 is an image diagram illustrating configuration adoptable as a communication link formed between the user terminal and the external control unit provided on the shared car.

FIG. 9 is an image diagram illustrating configuration adoptable as a communication link formed between the user terminal and the external control unit provided on the shared car.

A communication link 9001 is formed via a wide area network as an upper layer. A system is adopted in which the user terminal connects with the management server. The management server acts as a relay, and connects with the external control unit. In this case, the external control unit is also provided with a wide area communication function.

A communication link 9002 is directly connected by Bluetooth® communication. Both the user terminal and the external control means include Bluetooth® communication functions. They are configured to directly communicate with each other.

A communication link 9003 is directly connected by an RFID function. Both the user terminal and the external control means include RFID communication functions. They are configured to directly communicate in proximity.

Example 2

Figure 10:
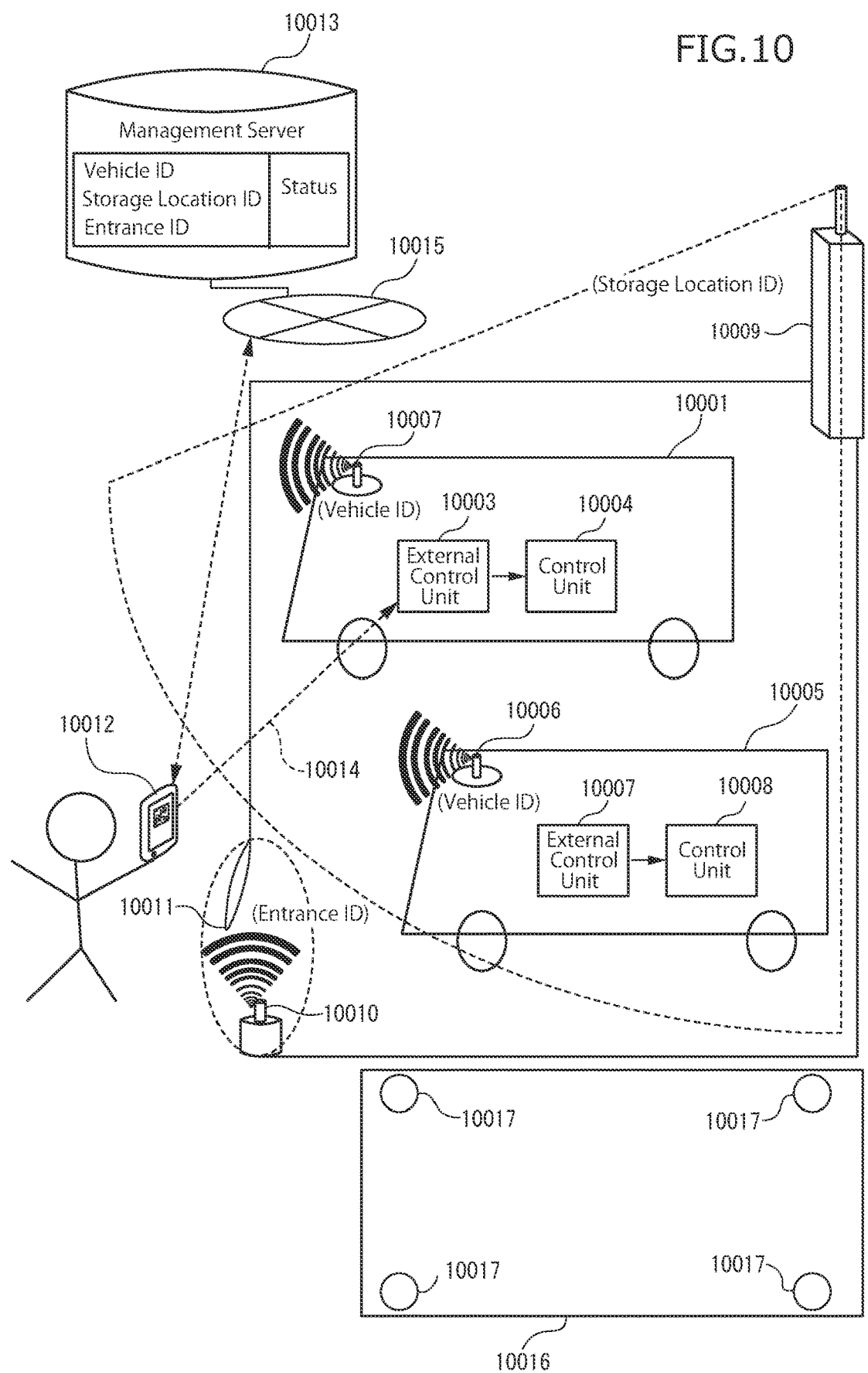
FIG. 10 is an overall diagram illustrating configuration of a system according to a second example of the present invention.

FIG. 10 is an overall diagram illustrating configuration of a system according to a second example of the present invention. The configuration includes a first shared car 10001, a second shared car 10005, a second beacon transmission device 10009 with an electric field strength that can be received by a user terminal, which will be described later, being set so as to reach a location where the shared car is kept, a third beacon transmission device 10010 provided at an entrance 10011 designated to the user as an entrance to the storage location, a management server 10013 for managing a sharing service, a user terminal 10012 owned by a user who intends to use a shared car, a wide area network 10015 of an upper layer, and a photographing area 10016 including lighting devices 10017 for taking an evidenced photograph, which will be described later.

The second beacon transmission device transmits a second beacon including a storage location ID specifying the storage location. The third beacon transmission device is set to transmit a third beacon with an electric field strength that can be received by the user terminal, which will be described later, being set so as to reach it when the user passes through the entrance. An entrance ID is an identifier for specifying the entrance.

The first shared car includes a first beacon transmission device 10002 that transmits a first beacon including a vehicle ID, and an external control unit 10003 that controls a control unit 10004 inherent in the vehicle from outside of its system. An arrow 10014 indicates Bluetooth® communication. This is a communication link between the user terminal 10012 and the external control unit 10003.

Similarly, the second shared car 10005 includes a first beacon transmission device 10006, and an external control unit 10007 that controls a control unit 10008 inherent in the vehicle from outside of its system.

Here, two shared cars are described. However, the configuration according to the present invention is not limited to this. It may be changed as appropriate according to a location where the sharing service is provided or the number of vehicles that can be prepared.

Also, the communication link is not limited to the Bluetooth® communication shown here. A communication link or the like via a management server or the like on a wide area network may be adopted as appropriate, as will be shown later.

The management server 10013 associates and stores a vehicle ID of the shared car, a storage location ID indicating the storage location of the shared car, the entrance ID indicating the entrance of the storage location, and a status representing availability of the vehicle.

The status is a vehicle state representing availability for each time period. Here, one of four vehicle states is stored: in use by a user, reserved, during maintenance, and idling. It is updated and recorded every time the status changes.

The functional configuration of the external control unit 10003 is the same as that of the external control unit in the first example. The functional configuration includes a command receiving unit that receives a command via a communication link formed between it and the user terminal, a command authentication unit that compares an authentication key included in the command with an authentication key set in advance to make authentication, and a vehicle state control unit that connects with the control unit 10004 to send out a signal for controlling a vehicle state, which includes unlocking/locking of a door.

Thereby, when settlement for handover of the usage right is arranged, a user who receives an issue of an authentication key can transmit a command from a user terminal of the user to unlock/lock the door from outside of the vehicle original system to use the vehicle. This enables handover of the right to use the vehicle to be shared.

FIG. 11 is a block diagram illustrating functional configuration of the management server 10013. A data management unit 11001 associates and manages the vehicle ID of the shared car, the storage location ID specifying the storage location of the shared car, the entrance ID to be acquired at the entrance set for monitoring or other security purposes, and the status representing availability of the shared car.

A request receiving unit 11002 receives a request from a user terminal via the wide area network 10015.

A request authentication unit 11003 authenticates the vehicle ID, the storage location ID, and the entrance ID included in the request, and compares a requested time period and a status, to determine availability.

In this way, using a plurality of IDs enables enhancement of security. In other words, by confirming that he is in the vicinity of the vehicle to be shared, that he is in the correct storage location, and that he is in the location after having passed through the correct entrance necessary for security, security is checked from different viewpoints.

A settlement request unit 11004 requests for settlement to a settlement institution designated by the requesting user, and receives a reply representing whether the settlement is allowable.

An authentication key transmission unit 11005 sends the authentication key via the wide area network 10015 to the requesting user terminal having obtained positive determination for availability and positive reply for allowability for settlement, to issue the authentication key. This is deemed as handover of the usage right.

A settlement unit 11006 calculates a charge concerning settlement for the user for whom the authentication key is issued. This is made by referring to a status at the time of returning back to obtain a usage time. And it executes the settlement for sharing.

A photograph storage unit 11007 receives an evidenced photograph, which will be described later, from the user terminal via the wide area network, to associate and store it with the handover of the usage right and the record of the settlement.

A vehicle damage extraction unit 11008 compares the above-described evidenced photographs which are associated and stored. The evidenced photographs are one at a time of commencing use and one at a time of returning back. Thereby, it extracts vehicle damage. When extracting the vehicle damage, it automatically informs a predetermined administrator via e-mail or the like.

FIG. 12 is a block diagram illustrating functional configuration of the user terminal 10012.

A beacon receiving unit 12001 is set so as to receive a beacon when the electric field strength exceeds a value set in advance. By being set in this way, it can receive the first beacon, the second beacon and the third beacon, and acquire the vehicle ID, the storage location ID and the entrance ID, only when the user passes through the designated entrance to approach the shared car. This enables to prevent access by anyone who have passed through other route than the designated one, or is in a location different from the shared car or the storage location. This enables to enhance security.

A request generation unit 12002 generates a request including the vehicle ID, the storage location ID, the entrance ID and a usage time period of the shared car input from an interface, not shown.

A request transmission unit 12003 sends the request for using the shared car to the management server via the wide area network.

An authentication key receiving unit 12004 receives the authentication key sent from the management server via the wide area network.

A command generation unit 12005 accepts a signal input by a user from an interface, not shown, to request for commencing use or to request for returning back, to generate a command including a door unlock instruction and the authentication key of the shared car at a time of commencing to use the shared car, and to generate a command including a door lock instruction and the authentication key of the shared car at a time of returning back the shared car.

A command transmission unit 12006 sends the command including the authentication key via the communication link 10014 to the external control unit provided on the shared car.

An evidenced photograph generation unit 12007 assists the user to generate an evidenced photograph by the system described in the first example.

A vehicle state reporting unit 12008 accepts a sending request input by the user from an interface, not shown, to send the evidenced photograph, created by the user with assistance of the evidenced photograph generation unit, to the management server via the wide area network.

Here, the communication of the 3G/LTE system is adopted as the communication via the wide area network. However, the wide area network of the present invention is not limited to this. It may be changed as appropriate.

Figure 13:
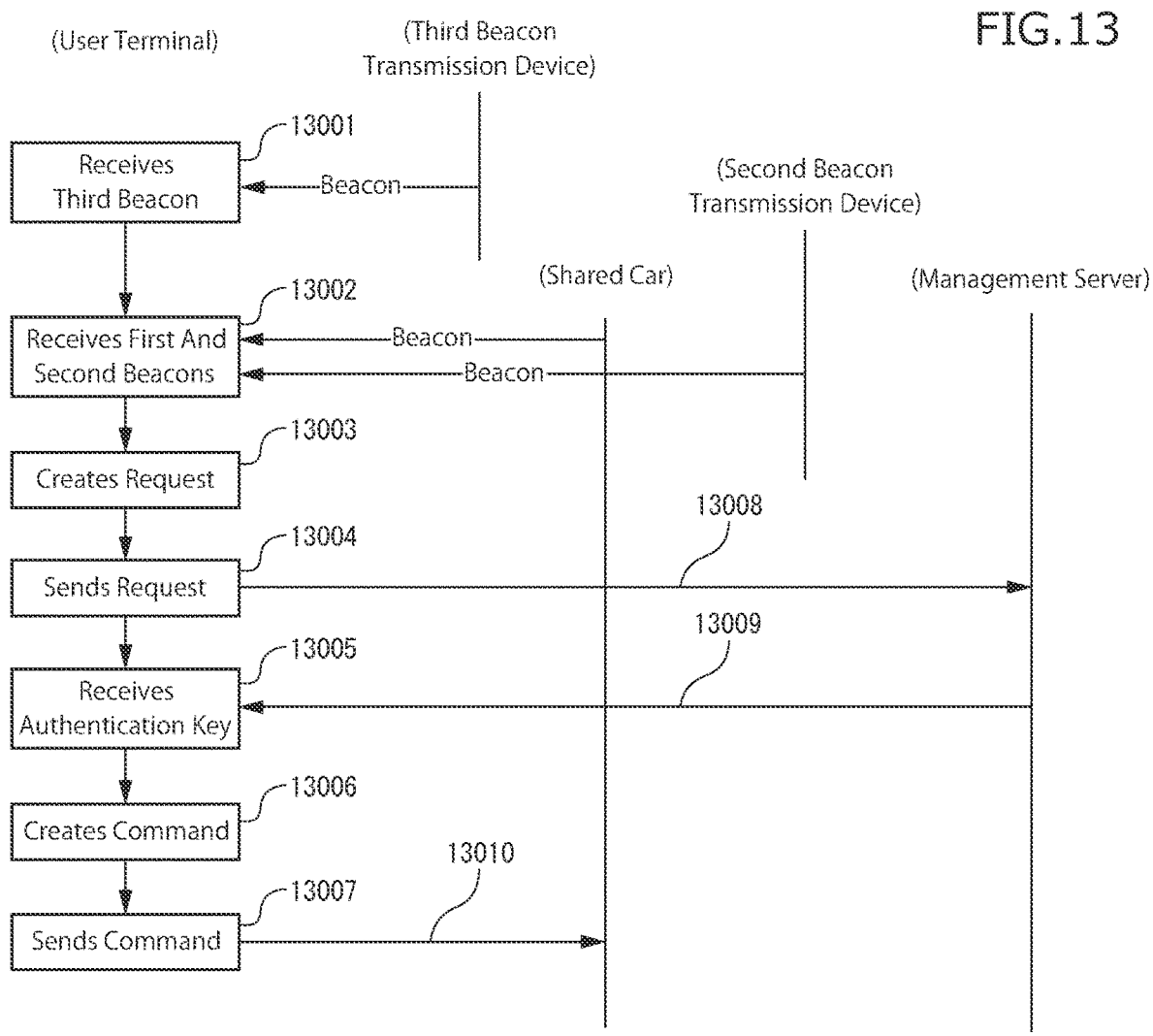
FIG. 13 is a flow chart focusing on the user terminal to illustrate operations concerning a request.

FIG. 13 is a flow chart focusing on the user terminal to illustrate operations concerning a request.

In a third beacon receiving step 13001, when the user passes through the entrance, the electric field strength of the third beacon exceeds the value set in advance. Then, the beacon receiving unit 12001 receives the third beacon including an entrance ID of the entrance, and acquires the entrance ID.

In a first and second beacon receiving step 13002, when the user enters the storage location and approaches the shared car, each of the electric field strengths of the first beacon and the second beacon exceeds the value set in advance. Then, the beacon receiving unit 12001 receives the first beacon including a vehicle ID of the shared car and the second beacon including a storage location ID, and acquires the vehicle ID and the storage location ID.

In a request creation step 13003, a request is created. This includes a vehicle usage time, the vehicle ID, the storage location ID, and the entrance ID.

In a request sending step 13004, the generated request is sent to the management server. A wide area communication 13008 is from the user terminal to the management server.

In an authentication key receiving step 13005, an authentication key is received. It is a reply to the authenticated request. A wide area communication 13009 is from the management server to the user terminal.

In a command creation step 13006, a command is generated. At a time of commencing to use the shared car, this includes a door unlock instruction and the authentication key of the shared car. At a time of returning back the shared car, the generated command includes a door lock instruction and the authentication key of the shared car.

In a command sending step 13007, the command including the authentication key is sent via a communication link with an external control unit provided on the shared car. A sending 13010 is via a communication link from the user terminal to the external control unit.

Figure 14:
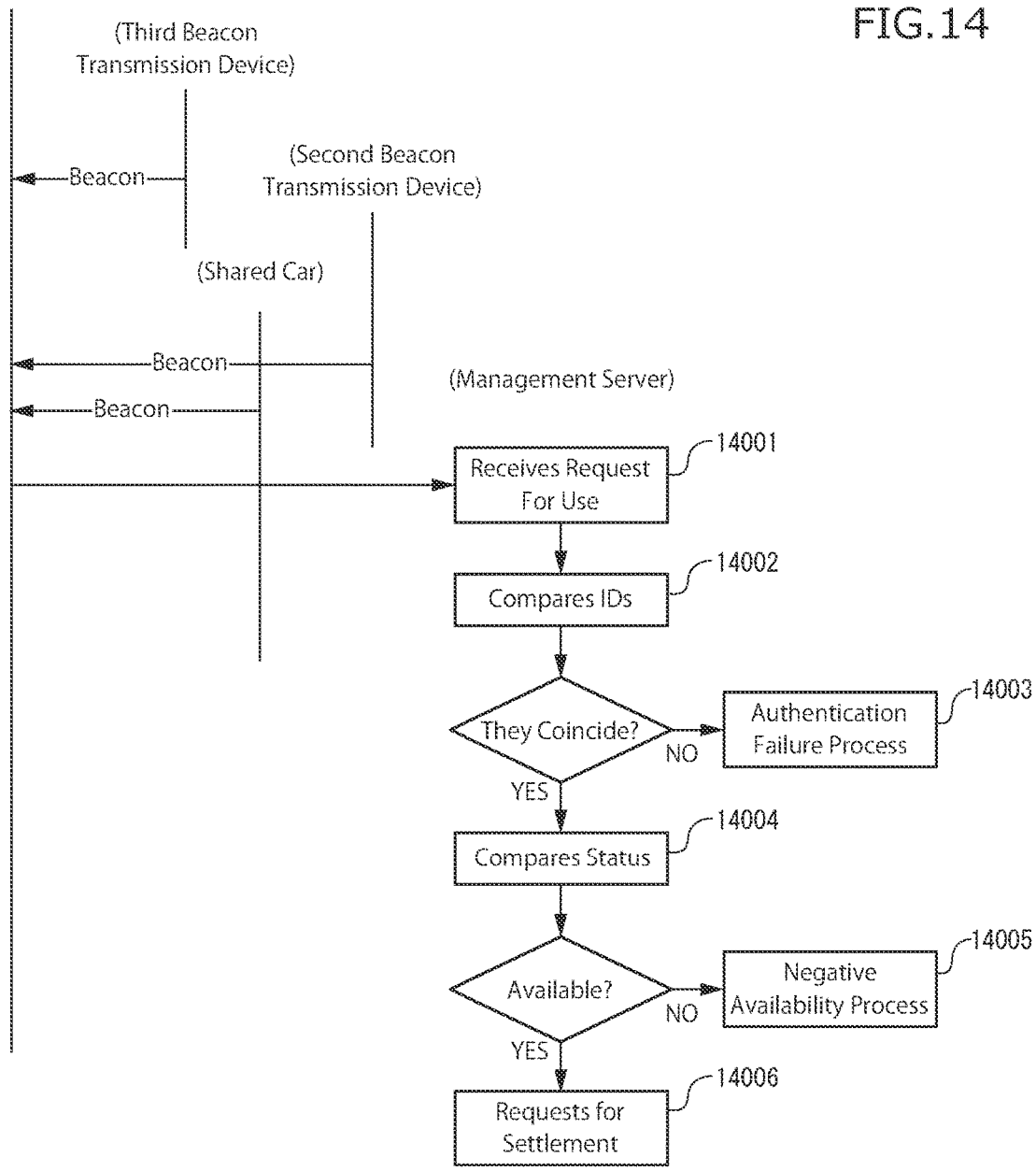
FIG. 14 is a flowchart focusing on the management server to illustrate operations from a request for use of a shared car to a request for settlement.

FIG. 14 is a flowchart focusing on the management server to illustrate operations from a request for use of a shared car to a request for settlement.

In a use request receiving step 14001, the management server receives a request that requests for commencing use from the user terminal via the wide area network.

In an ID comparison step 14002, the management server compares the vehicle ID, the storage location ID and the entrance ID included in the request with the vehicle ID, the storage location ID and the entrance ID stored in the management server.

When they do not coincide, the operation of the management server shifts to an authentication failure process 14003. It notifies the user terminal of the authentication failure, or otherwise performs predetermined operations.

When they coincide, the operation of the management server shifts to the status comparison step 14004. It compares the vehicle usage time included in the request with a time period with an idling status stored in association with the vehicle ID or the like, to determine availability.

When the vehicle usage time and the idling time period do not match, the availability is negative. The operation of the management server shifts to a negative availability process 14005. It notifies the user terminal that the vehicle is not idling, or otherwise performs predetermined operations.

When the vehicle usage time and the idling time period match, the availability is positive. and thereby, the authentication is completed. The operation of the management server shifts to a settlement request step 14006. It requests for settlement to a settlement server of the settlement institution designated in advance by the user.

Figure 15:
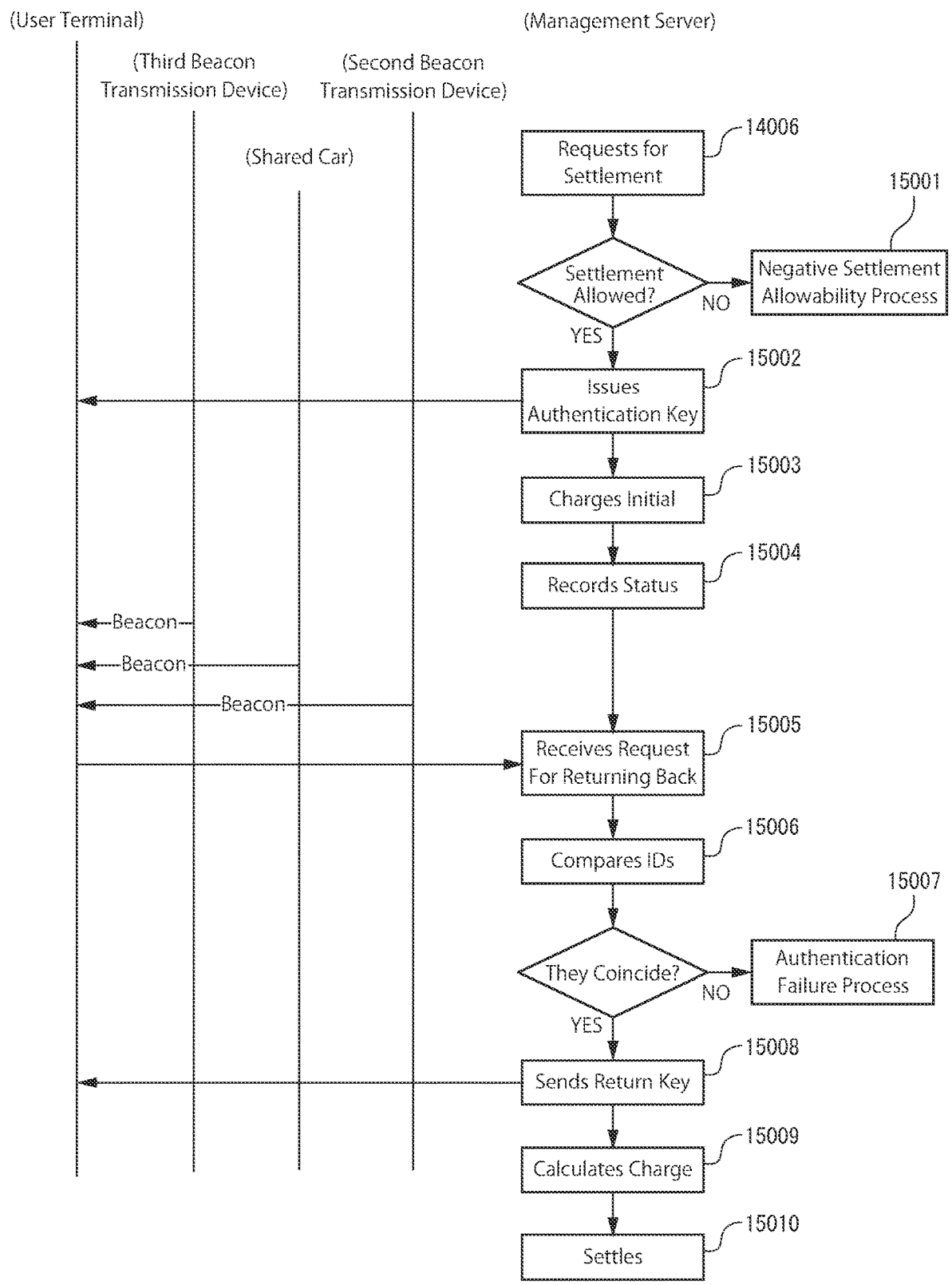
FIG. 15 is a flowchart focusing on the management server to illustrate operations from a request for settlement for the use of the shared car to execution of the settlement.

FIG. 15 is a flowchart focusing on the management server to illustrate operations from a request for settlement for the use of the shared car to execution of the settlement.

When a negative settlement allowability notification is received from the settlement server in response to the request in the settlement request step 14006, the settlement is impossible. The operation of the management server shifts to a negative settlement allowability process 15001. It makes notification that the settlement institution designated by the user cannot be used, or otherwise perform predetermined operations.

When a positive settlement allowability notification is received from the settlement server, the settlement is possible. The operation of the management server shifts to an authentication key issuing step 15002. It sends an authentication key to the user terminal via the wide area network. This is necessary for activating the external control unit of the shared car having the vehicle ID included in the request.

In an initial charging step 15003, the management server performs a settlement process to the settlement server for initial charging in exchange for the handover of the usage right by sending the authentication key.

In a status recording step 15004, the management server records the usage time period included in the request as "in use".

In a return request receiving step 15005, the management server receives a return request sent from the user terminal via the wide area network.

In an ID comparison step 15006, the management server compares the vehicle ID, the storage location ID and the entrance ID included in the request with the vehicle ID, the storage location ID and the entrance ID stored in the management server to make authentication.

When the IDs included in the request do not coincide with the IDs stored in the management server, the operation of the management server shifts to an authentication failure process 15007. It notifies the user terminal of the authentication failure, or otherwise performs predetermined operations.

When they coincide, the authentication succeeds. The operation of the management server shifts to a return key sending step 15008. It sends an authentication key for locking and returning back the shared car to the user terminal via the wide area network.

In a charge calculation step 15009, the management server performs a calculation for multiplying the usage time by a predetermined unit price per hour, to calculate a charge.

In a settlement step 15010, the management server notifies the settlement institution of the calculated charge, to performs a settlement process.

As for the present application, a priority is claimed based on Japanese Patent Application No. 2017-056423, and the contents of the basic application are all incorporated into the present application.

INDUSTRIAL APPLICABILITY

The invention disclosed in the present invention is available in all industries related to a sharing service. The object of the share is not limited to the shared car. The present invention is applicable for a motorcycle, a bicycle, or other movable shared objects.

REFERENCE SIGNS LIST

1001: First shared car; 1002: beacon transmission device; 1003: external control unit; 1004: control unit inherent in shared car; 1009: management server; 1010: user terminal; and 1013: photographing area.

The invention claimed is:

1. A shared car system, in which a user operates a user terminal possessed by him to execute settlement for handover of a usage right to use a vehicle for a certain period, the system comprising:
   a) a beacon transmission device provided on the vehicle, for transmitting a beacon signal including a vehicle ID within an area set in advance;
   b) a beacon receiving device provided on the user terminal, for receiving the beacon signal;
   c) an external control circuit provided on the vehicle, for receiving a command including an authentication key for the usage right, and for performing vehicle state control including at least unlocking/locking a door of the vehicle from outside a control system inherent in the vehicle;
   d) a sending device provided on the user terminal, and for establishing a communication link with the external control circuit to send the command to the external control circuit; and
   e) a management computer located on a communication network, for linking and storing the vehicle ID with a status of the usage right,
   wherein the management computer compares a request including a vehicle ID sent from the user terminal for the handover with the stored vehicle ID to make authentication, issues an authentication key for the usage right to the user terminal based on a result of the authentication and a state of the status, and executes settlement for the handover by the user terminal.

2. The system of claim 1, wherein the sending device sends the command a via short-range wireless, and the external control circuit receives the command sent by the sending device via short-range wireless.

3. The system of claim 1, wherein the sending device sends the command to the management computer, the management computer receives the command sent by the sending device and sends the received command to the external control circuit, and the external control circuit receives the command sent by the management computer.

4. The system of claim 1, wherein the vehicle state control includes restricting/releasing engine start of the vehicle.

5. The system of claim 1, wherein the settlement includes a settlement of a minimum charge at a time of renting out the vehicle.

6. A shared car system, in which a user operates a user terminal possessed by him to execute settlement for handover of a usage right to use a vehicle for a certain period, the system comprising:
   a) a first beacon transmission device installed on the vehicle, for transmitting a first beacon signal including a vehicle ID;
   b) a second beacon transmission device installed on a storage location of the vehicle, for transmitting a second beacon signal including a storage location ID;
   c) a beacon receiving device provided on the user terminal, for receiving the first beacon signal and the second beacon signal;
   d) an external control circuit provided on the vehicle, for receiving a command including an authentication key for the usage right and for performing vehicle state control including unlocking/locking a door of the vehicle from outside a control system inherent in the vehicle;
   e) a sending device provided on the user terminal, and for establishing a communication link with the external control means to send the command to the external control circuit; and
   f) a management computer located on a communication network, for linking and storing the storage location ID, the vehicle ID and a status of the usage right,
   wherein the management computer compares a request including a storage location ID and a vehicle ID sent from the user terminal with the stored storage location ID and vehicle ID to make authentication, issues an authentication key for the usage right to the user terminal based on a result of the authentication and a state of the status, and executes settlement for the handover by the user terminal.

7. The system of claim 6, wherein the user terminal includes a camera, and a vehicle state reporting means for sending to the management computer a certification photograph obtained by attaching a storage location ID or a vehicle ID to an image of the vehicle acquired by the camera,
   wherein the management computer receives the certification photograph to associate and stores it with a record of handover of the usage right or the settlement.

8. The system of claim 7, wherein a photographing area is installed corresponding to the storage location, for acquiring the image of the vehicle.

9. The system of claim 7, wherein the image is images including a front side, left and right sides and a rear side of the vehicle.

10. The system of claim 7, wherein the image includes an image of a vehicle site selected by the user.

11. The system of claim 7, wherein the image is an image acquired at a time of renting out the vehicle, or at a time of returning back the vehicle.

12. The system of claim 11, wherein the image includes images acquired at a time of renting out the vehicle and at a time of returning back the vehicle, and
   the image at a time of renting out and the image at a time of returning back are compared to extract the vehicle damage occurring during the sharing.

13. The system of claim 6, further comprising a third beacon transmission device for transmitting a third beacon signal,
   wherein the authentication includes authentication of the third beacon signal received by the user terminal.

14. The system of claim 6, wherein the sending device sends the command via short-range wireless, and the external control circuit receives the command sent by the sending device via short-range wireless.

15. The system of claim 6, wherein the sending device sends the command to the management computer, the management computer receives the command sent by the sending device and send the received command to the external control circuit, and the external control circuit receives the command sent by the management computer.

16. The system of claim 6, wherein the vehicle state control includes restricting/releasing engine start of the vehicle.

17. The system of claim 6, wherein the settlement includes a settlement of a minimum charge at a time of renting out the vehicle.

18. A system for sharing a vehicle, the system comprising:
at least one beacon transmission device for transmitting a beacon signal via wireless within a predetermined area therearound; the beacon signal including an ID,
a mobile terminal device possessed by a user;
a management computer for managing a state of the vehicle; and
a control device for controlling the vehicle,
wherein the mobile terminal device has:
a beacon receiving unit for receiving the beacon signal transmitted from the beacon transmission device when the mobile terminal device is located within the predetermined area;
a request transmission unit for sending a request signal to the management computer; the request signal including the ID included in the beacon signal received by the beacon receiving unit,
an authentication key receiving unit for receiving an authentication key signal from the management computer; the authentication key signal including an authentication key, and
a command transmission unit for sending a command signal to the control device, the command signal including the authentication key included in the authentication key signal received by the authentication key receiving unit,
wherein the management computer has:
a request receiving unit for receiving the request signal sent from the mobile terminal device;
a request authentication unit for determining based on the request signal received by the request receiving unit whether the user is permitted to use the vehicle;
a settlement determination unit for determining whether the user is allowed to execute settlement,
an authentication key transmission unit for sending the authentication key to the mobile terminal device when the request authentication unit determines the user is permitted to use the vehicle and simultaneously the settlement determination unit determines the user is allowed to execute settlement,
wherein the control device has:
a command receiving unit for receiving the command signal sent from the mobile terminal device;
a command authentication unit for determining based on the command signal received by the command receiving unit whether the user is permitted to use the vehicle; and
a control unit for controlling the vehicle based on the command signal when the command authentication unit determines the user is permitted to use the vehicle,
wherein one of the at least one beacon transmission device is mounted on the vehicle, and the ID included in the beacon signal transmitted therefrom includes a vehicle ID for identifying the vehicle, and
wherein a condition used by the request authentication unit for determining whether the user is permitted to use the vehicle includes whether the user is near the vehicle, and the request authentication unit determines based on the vehicle ID included in the request signal whether the user is near the vehicle.

19. The system of claim 18,
wherein another one of the at least one beacon transmission device is installed at a storage location of the vehicle, and the ID included in the beacon signal transmitted therefrom includes a storage location ID for identifying the storage location, and
wherein the condition used by the request authentication unit for determining whether the user is permitted to use the vehicle includes whether the user is near the storage location, and the request authentication unit determines based on the storage location ID included in the request signal whether the user is near the storage location.

20. The system of claim 18, wherein the management computer further has a settlement unit for executing a settlement for the user when the authentication key transmission unit sends the authentication key signal to the mobile terminal device.

* * * * *